Figure 1:
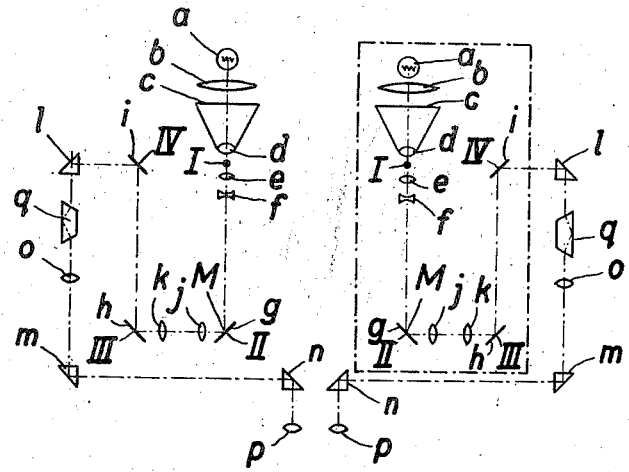

June 21, 1938.  O. VON GRUBER  2,121,081

STEREOPHOTOGRAMMETRIC PLOTTING APPARATUS

Filed Oct. 23, 1937  2 Sheets-Sheet 1

Inventor:
Otto v. Gruber

June 21, 1938.  O. VON GRUBER  2,121,081
STEREOPHOTOGRAMMETRIC PLOTTING APPARATUS
Filed Oct. 23, 1937  2 Sheets-Sheet 2

Inventor:
Otto v. Gruber

Patented June 21, 1938

2,121,081

UNITED STATES PATENT OFFICE 2,121,081

STEREOPHOTOGRAMMETRIC PLOTTING APPARATUS

Otto von Gruber, Jena, Germany, assignor to the firm of Carl Zeiss, Jena, Germany Application October 23, 1937, Serial No. 170,553
In Germany October 28, 1936

2 Claims. (Cl. 33—20)

This application has been filed in Germany, October 28, 1936.

The invention concerns a stereophotogrammetric plotting apparatus comprising two projection chambers, each of which contains an image plate and an objective; two mirrors, which are cardanically so mounted on a carrier universally displaceable relatively to the chambers that the centre of rotation and the interior axis of rotation of each mirror lie in the reflecting surface, a mark being disposed on each of these mirrors in such a manner as to coincide with the centre of rotation; and two lens systems which are cardanically mounted near the chamber objectives and each of which consists of a plurality of members that are adjustable relatively to each other according to the distance of the corresponding mark from the corresponding objective, this adjustment being for the purpose of controlling the sharp imaging of a point of the corresponding image plate on the corresponding mark. Plotting apparatus of this kind have been made known for instance by the U. S. Patent 1,478,693.

According to the invention, the optical system of a plotting apparatus of this kind is constructed as follows: To each chamber are coordinated two further mirrors, which are so mounted on the support of the two chambers and, cardanically, on the said mirror carrier, respectively, that the centre of rotation and the interior axis of rotation of each of these two mirrors lie in the reflecting surface and that the centres of rotation of the two mirrors are so positioned relatively to the centre of rotation of the corresponding lens system and to the centre of rotation of the corresponding mirror provided with a mark that the four centres of rotation determine a parallelogram regardless of what position the said mirror carrier assumes relatively to the chambers. The three mirrors coordinated to each chamber are so coupled to each other that a ray striking the mirror with a mark and coinciding with that side of the said parallelogram which is determined by the centres of rotation of this mirror and the corresponding lens system is reflected by the mirrors in such a manner as to traverse the three other sides of the parallelogram (in the case of the last side, eventually the elongation).

In the rear of each mirror having a mark is provided a lens system the focus of which coincides with the mark of the mirror and whose rearmost member is in front of the mirror mounted on the support of the two chambers.

To prevent any member of this last said lens system from taking part in the rotations of a mirror, it is advisable to place all members of this lens system between the mirror having a mark and the mirror which follows next in the direction of the light.

Not only can the four parts coordinated to each camera, namely the three mirrors and the lens system controlling the sharp imaging, be mounted cardanically, i. e., in such a manner that the two axes of rotation of each part intersect each other at right angles, but each of these four parts can have as well a bearing in which the two axes of rotation cross each other at right angles. In this latter case, four such axes of the four parts as correspond to each other are to be parallel and so positioned relatively to each other that the said parallelogram is determined by the points at which these axes traverse a plane at right angles to them.

With respect to the known apparatus of the described kind, a plotting apparatus according to the invention offers the advantage that a more compact construction is obtained, that the observer is given better access to the parts to be moved for adjustment of the base and orientation of the image plates, and that less optical members are required when the rays are suitably directed.

Figure 2:
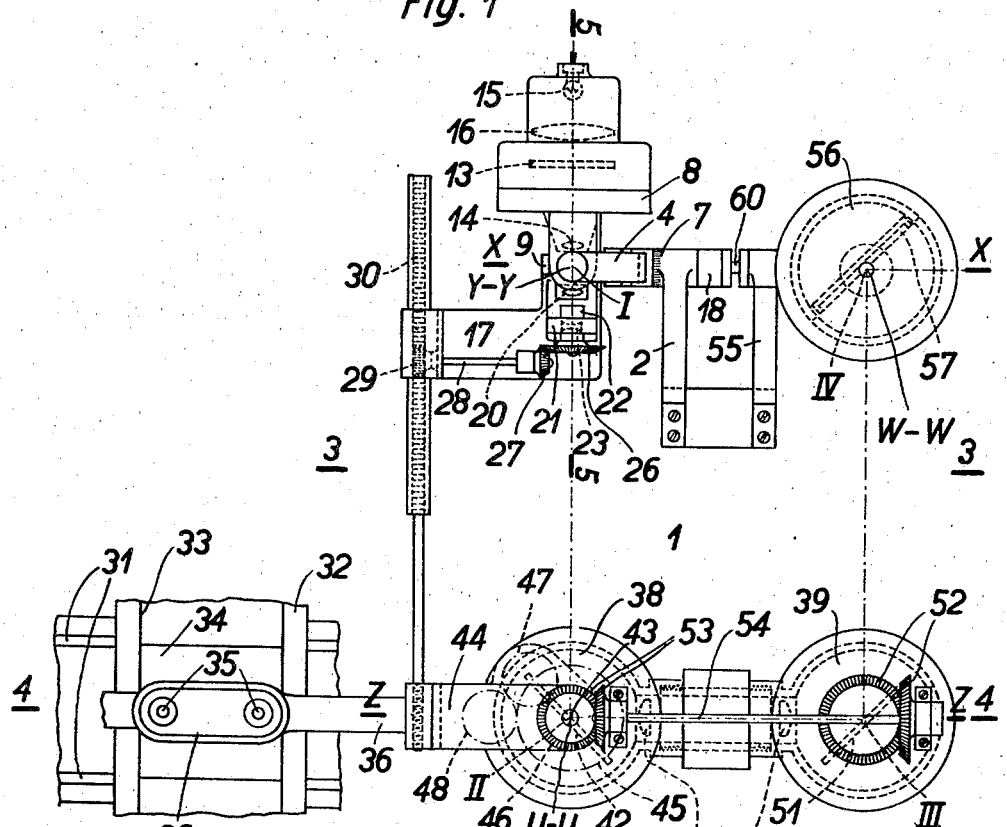
Figure 3:
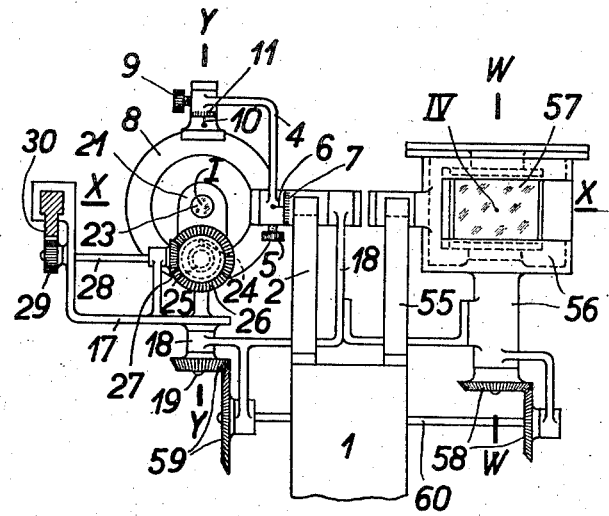
Figure 5:
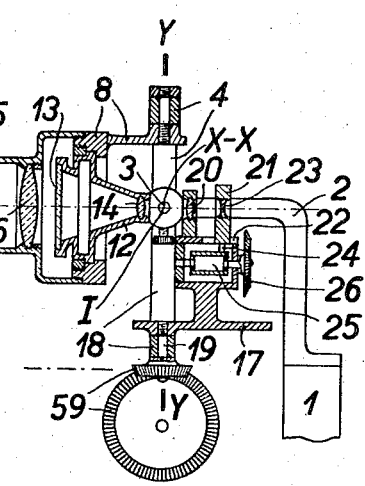
Figure 4:
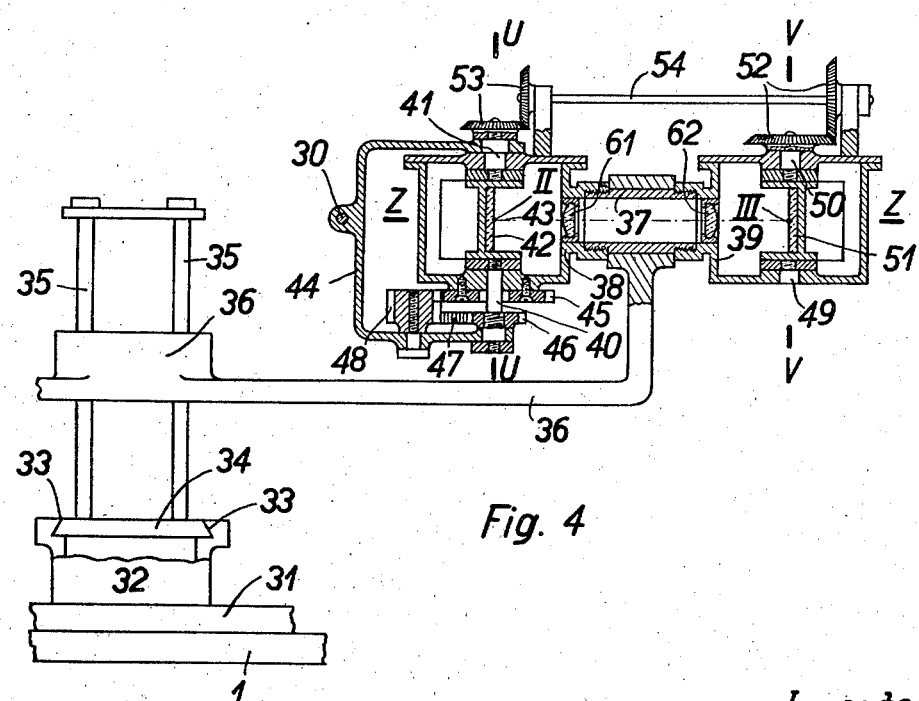

In the accompanying drawings, Figure 1 shows schematically the entire optical system of a plotting apparatus according to the invention, and Figures 2 to 5 represent on an enlarged scale that part of this system which the observer sees in the right half of the ray path and which, when the plotting apparatus is in use, comprises the members movable relatively to each other. (The said part is within the dot-and-dash line quadrangle in Figure 1.) Figure 2 is a plan view of this part, and Figures 3 to 5 show vertical sections through the section lines indicated in Figure 2.

The optical system of the plotting apparatus according to Figure 1 contains in each half of the ray path: An illumination device consisting of a light source $a$ and a condenser $b$; a projection chamber containing an image plate $c$ and an objective $d$ and which is cardanically mounted on the base plate of the apparatus for rotation about a point I (the base plate not being represented in the drawings), so that the inclination of the projection chamber can be adjusted as desired; a lens system that consists of a convergent lens $e$ and a divergent lens $f$ and controls the sharp imaging and which is cardanically mounted for rotation about the point I and whose divergent lens $f$ is adjustable relatively to the convergent lens $e$; a mirror $g$ which has a mark M and is adjustable by means of a three-dimensional cross-slide system displaceable relatively to the base plate of the apparatus and is so mounted cardanically on this cross-slide system as to be rotatable about a point II which coincides with the mark M (the system of cross slides not being represented in the drawings); a mirror $h$ which is so mounted cardanically on the cross-slide system as to be rotatable about a point III; a mirror $i$ which is cardanically so mounted on the base plate of the apparatus so as to be rotatable about a point IV positioned relatively to the points I, II and III in such a manner that the four points I to IV determine a parallelogram; a lens system which consists of two members $j$ and $k$ and whose focus coincides with the point II and which is disposed between the mirrors $g$ and $h$ on the system of cross slides; three reflecting prisms $l$, $m$ and $n$ fast with the base plate of the apparatus and following the mirror $i$; an objective $o$ disposed between the prisms $l$ and $m$; an eye-piece $p$; and a rotatable Amici prism $q$ disposed between the prism $l$ and the objective $o$, this Amici prism preventing the images from tumbling.

In Figures 2 to 5, 1 designates a base plate on which a shaft 3 whose axis is designated X—X is fixed by means of an arm 2. On the shaft 3 is mounted an arm 4 which is rotatable about the axis X—X and can be fixed with respect to the shaft 3 by means of a clamping screw 5. An index 6 on the arm 4 indicates on a division 7 on the arm 2 the position the arm 4 assumes with respect to this arm 2. On the arm 4 is mounted a bearing body 8 rotatable about an axis Y—Y intersecting the axis X—X at the point I. By means of a clamping screw 9, the bearing body 8 can be fixed with respect to the arm 4. An index 10 of the bearing body 8 indicates on a division 11 on the arm 4 the position the bearing body 8 assumes with respect to this arm 4. A plate carrier 12, which contains an image plate 13 and an objective 14 lying in the projection centre of this image plate, is so rotatable in the bearing body 8 and about the axis of the objective 14 that the axis of rotation of this carrier 12 contains the point of intersection I of the axes X—X and Y—Y and is at right angles to these axes. On the bearing body 8 is mounted a device for illuminating the image plate 13 and containing a light source 15 and a condenser 16.

In addition to the bearing body 8, a supporting plate 17 is cardanically so mounted on the arm 2 of the base plate 1 that it is rotatable about the point I and that its exterior cardan axis coincides with the axis X—X. To this effect, an arm 18 mounted on the shaft 3 is loosely rotatable about the axis X—X. By means of a shaft 19, the supporting plate 17 is so mounted on the arm 18 as to be loosely rotatable about an axis which intersects the axis X—X at right angles at the point I and coincides with the axis Y—Y when the position of the arm 18 is that illustrated in the drawings.

A convergent lens 20 is so mounted on the supporting plate 17 that its axis contains the point I, and a slide 21 is displaceable on this plate 17 in a guide 22 parallel to the axis of the convergent lens 20. The slide 21 holds a divergent lens 23 whose axis coincides with that of the convergent lens 20. By means of a pin 24, the slide 21 extends into a helical groove in a drum 25 which is so mounted on the supporting plate 17 as to be rotatable about an axis parallel to the axis of the convergent lens 20 and which is rigidly connected to a bevel wheel 26 in such a manner that the axis of this wheel 26 coincides with the axis of rotation of the drum 25. The bevel wheel 26 is operated by means of a bevel wheel 27, a shaft 28 and a spur wheel 29 actuated by a rack 30 which is so mounted on the supporting plate 17 as to be displaceable parallel to the axis of the convergent lens 20. The lenses 20 and 23 and the said helical groove are constructed in such a manner and the ratio of transmission of the toothings 26, 27 and 29, 30 is such that an image point of the image plate 13 is always sharply imaged at a point II lying in the axis of the lens system 20, 23 and (as will be described hereinafter) being displaceable three-dimensionally.

On the base plate 1 is mounted a slide 32 displaceable along two guides 31 parallel to the axis X—X. The slide 32 is provided with two guides 33 which are at right angles to the guides 31 and guide a slide 34. On the slide 34 are fixed two guide rods 35 which are at right angles to the guides 31 and 33 and along which a slide 36 can be displaced. The mechanisms for operating the slides 32, 34 and 36 are omitted in the drawings for the sake of simplicity.

On the slide 36 is mounted a bushing 37 rotatable about an axis Z—Z which is parallel to the axis X—X and contains the point II. To this bushing 37 are screwed two housings 38 and 39. In the housing 38, a mirror 42 is rotatable by means of two pins 40 and 41 about an axis U—U which intersects the axis Z—Z at right angles at the point II and lies in the reflecting surface of the mirror 42. A mark 43 constituting a half image of a stereoscopic mark image is so disposed on the mirror 42 that the point decisive of the measurement coincides with the point of intersection II of the axes Z—Z and U—U.

A fork 44 is loosely rotatable about the pins 40 and 41 and rigidly connected to the rack 30.

To provide that a rotation of the fork 44 about the axis U—U entails a rotation of the mirror 42 in the same sense, but through only half the angle of rotation of the fork 44, provision is made of the following coupling: To the housing 38 is fixed a toothed wheel 45 whose axis coincides with the axis U—U. Another toothed wheel 46 whose axis coincides with the axis U—U and the diameter of whose divided circle is half as great as that of the toothed wheel 45, is fixed to the pin 40 and, consequently, rigidly connected to the mirror 42. In mesh with the toothed wheel 46 is a toothed wheel 47 which is rotatably mounted at the fork 44 and the diameter of whose divided circle is identical with that of the toothed wheel 46. On the fork 44, a toothed wheel 40, the diameter of whose divided circle is identical with that of the toothed wheel 46 is rotatably mounted in such a manner as to mesh with both the toothed wheel 45 and the toothed wheel 47. When the fork 44 is rotated about the axis U—U, the toothed wheel 48 rolls on the toothed wheel 45 fixed to the housing 38 and effects through the agency of the toothed wheel 47 that the toothed wheel 46 and, accordingly, the mirror 42 are rotated in the same sense as the fork 44, but through only half the angle of rotation thereof.

In the housing 39, a mirror 51 is so mounted by means of two pins 49 and 50 as to be rotatable about an axis V—V which intersects the axis Z—Z at right angles at a point III, and which is parallel to the axis U—U and lies in the reflecting surface of the mirror 51. The mirrors 51 and 42 are so coupled by means of two pairs of bevel wheels 52 and 53 and a shaft 54 that they rotate through the same angle and in the same sense and that their reflecting surfaces are at right angles to each other.

Lenses 61 and 62 are so mounted in the housings 38 and 39, respectively, that the axes of these two lenses coincide with the axis Z—Z. The focus of the lens system 61, 62 coincides with the point II, so that a cone of rays which strikes the lens 61 and whose apex lies at the point II is in the form of a cylindrical ray pencil when emanating from the lens 62.

A housing 56 is so mounted on the base plate 1 by means of an arm 55 as to be rotatable about an axis coinciding with the axis X—X. This housing 56 is fixed to the arm 18 and effects, in consequence thereof, the same rotations about the axis X—X as do the plate 17 and the lens system 20, 23. In the housing 56, a mirror 57 is rotatable about an axis W—W which is parallel to the axis Y—Y and which lies in the reflecting surface of the mirror 57 and intersects the axis Z—Z at right angles at a point IV which is at such a distance from the point I as is equal to the distance apart of the points II and III, the points I to IV determining, accordingly, a parallelogram. By means of two pairs of bevel wheels 58 and 59 and a shaft 60, the mirror 57 is so coupled to the shaft 19 fixed to the supporting plate 17 that rotations of this supporting plate 17 about the axis of the shaft 19 entail rotations of the mirror 57 in the same sense and through half the angle, the reflecting surface of this mirror 57 being at right angles to the reflecting surface of the mirror 42. The means for adjusting the base, which are known per se, are omitted in the drawings for the sake of simplicity and because they are of no great importance in explaining the invention.

The described construction of the apparatus ensures that, regardless of what position is assumed by the cross-slide system 32, 34, 36, a ray emanating from an image point of the image plate 13 and containing the point I and coinciding with the axis of the lens system 20, 23 strikes the mirror 42 at the mark 43 coinciding with the point II, that the said ray is so reflected by the mirror 42 as to strike the mirror 51 at the point III, that this ray is so reflected by the mirror 51 as to strike the mirror 57 at the point IV, and that this ray is finally so reflected by the mirror 57 as to continue in the elongation of the line interconnecting the points I and IV.

I claim:

1. In a stereophotogrammetric plotting apparatus, two projection chambers; a support for these chambers; a carrier displaceable in any direction relatively to the support of the chambers; two mirrors; and two lens systems; each chamber containing an objective and an image plate; the said two mirrors being cardanically so mounted on the said carrier that the Cardan centre and the interior Cardan axis of each mirror lie in the mirror surface; a mark being so disposed on each mirror as to coincide with the Cardan centre; each of the said two lens systems consisting of a plurality of members, which are adjustable relatively to each other, and being cardanically so mounted on the said support that its Cardan centre is near the objective of one of the two chambers and, for the sharp imaging of a point of the corresponding image plate on the corresponding mirror mark, being so coupled to the said carrier that changes of the distance apart of the corresponding image mark and the corresponding chamber objective entail a reciprocal adjustment of the lens members; two other mirrors being coordinated to each of the two chambers and cardanically so mounted on the said support and the said carrier, respectively, that the Cardan centre and the inner Cardan axis of each mirror lie in the reflecting surface and that the Cardan centres of both mirrors, the Cardan centre of the corresponding lens system and the corresponding mirror mark determine a parallelogram; the said two mirrors and the corresponding mark mirror being coupled to each other in such a manner that these three mirrors so reflect a light ray coinciding with that side of the said parallelogram which is determined by the mirror mark and the Cardan centre of the lens system that this ray traverses subsequently to each other the next two sides of the parallelogram and then a straight line which coincides with the last side of the parallelogram, another lens system, which consists of a plurality of members, being so disposed in the rear of each of the two mark mirrors that its focus coincides with the mirror mark and its rearmost member is in front of that corresponding mirror which is mounted on the chamber support.

2. In a stereophotogrammetric plotting apparatus according to claim 1, all members of the said other lens system lying between those two corresponding mirrors which are mounted on the said mirror support.

OTTO v. GRUBER.